United States Patent [19]
Hone-Lin

[11] Patent Number: 5,359,152
[45] Date of Patent: Oct. 25, 1994

[54] STRUCTURE OF WALL MOUNTING JUNCTION BOX

[76] Inventor: Tan Hone-Lin, No. 6, Alley 166, Yuh Cheng Street, Taipei, Taiwan

[21] Appl. No.: 43,226

[22] Filed: Apr. 6, 1993

[51] Int. Cl.⁵ .............................................. H02G 3/08
[52] U.S. Cl. ........................................ 174/53; 220/3.4
[58] Field of Search ..................... 174/53; 220/3.2, 3.3, 220/3.4, 3.8

[56] References Cited

U.S. PATENT DOCUMENTS

| | | | |
|---|---|---|---|
| 3,015,408 | 1/1962 | Campbell et al. | 220/3.4 |
| 3,619,476 | 11/1971 | Rasmussen | 220/3.4 X |
| 3,745,664 | 7/1973 | Altseimer | 220/3.4 X |
| 4,214,667 | 7/1980 | Lass | 174/53 |

FOREIGN PATENT DOCUMENTS 2194691  3/1988  United Kingdom ................. 174/53

Primary Examiner—Leo P. Picard
Assistant Examiner—David A. Tone
Attorney, Agent, or Firm—Lowe, Price, LeBlanc & Becker

[57] ABSTRACT

A junction box is disclosed including a flexible plastic casing, two metal mounting tabs fastened to the casing at the top at two opposite locations through plug joints, and a rigid cover board detachably covered on the casing in a flush manner to protect the casing against deformation during its installation. Each metal mounting tab has an outward wing which is embedded in concrete after the installation, so that the casing is fixed in place.

4 Claims, 5 Drawing Sheets

STRUCTURE OF WALL MOUNTING JUNCTION BOX

BACKGROUND OF THE INVENTION

The present invention relates to junction boxes, and more particularly the present invention relates to a wall mounting junction box which comprises metal mounting tabs partially embedded in concrete to hold down the flexible plastic casing thereof in place.

Various wall mounting junction boxes are known, and widely used for different purposes. These junction boxes are commonly made of flexible materials (plastics) or metal. A metal junction box is expensive, and produces less binding force to concrete. FIG. 5 illustrates a conventional plastic wall mounting junction box which is made from a flexible plastic material through an injection molding process, having two unitary inward mounting tabs at the top for fastening an electric device on the inside by screws. This structure of plastic wall mounting junction box is inexpensive to manufacture, however, it is not satisfactory in use. When embedded within the wall and peripherally covered with concrete, the body of this structure of plastic wall mounting junction box will be squeezed to deform. When deformed, it is difficult to install an electrical device in the junction box. Another disadvantage of this structure of plastic wall mounting junction box is that concrete may enter the junction box, and the junction box shall have to be properly cleaned after its installation. Further, because the mounting tabs are integrally formed on the junction box, the hole on each mounting tab may be damaged or expanded while threading a tie screw. When the hole on either mounting tab is damaged or expanded, the electrical device being fastened inside the junction box will become unstable.

SUMMARY OF THE INVENTION

The present invention eliminates the aforesaid disadvantages. It is therefore an object of the present invention to provide a wall mounting junction box which does not deform when embedded in concrete. It is another object of the present invention to provide a wall mounting junction box which produces a satisfactory binding force to concrete. It is still another object of the present invention to provide a wall mounting junction box which has detachable means to protect against permeation of concrete during its installation. It is still another object of the present invention to provide a wall mounting junction box which has metal mounting tabs for mounting an electrical device positively.

DETAILED DESCRIPTION OF THE PREFERRED EMBODIMENT

Figure 1:
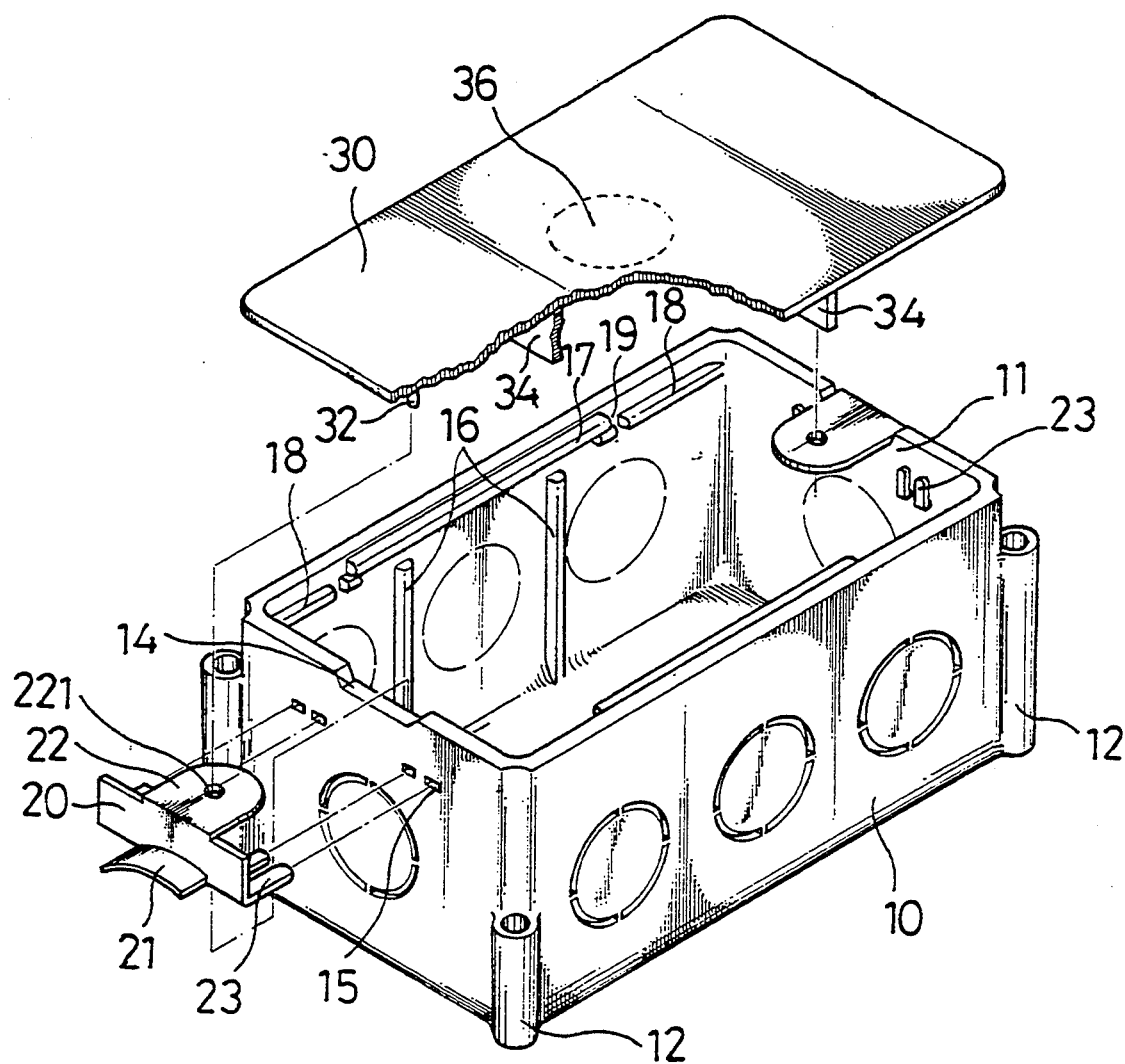
FIG. 1 is a perspective exploded view of a junction box constructed according to the present invention.
Figure 2:
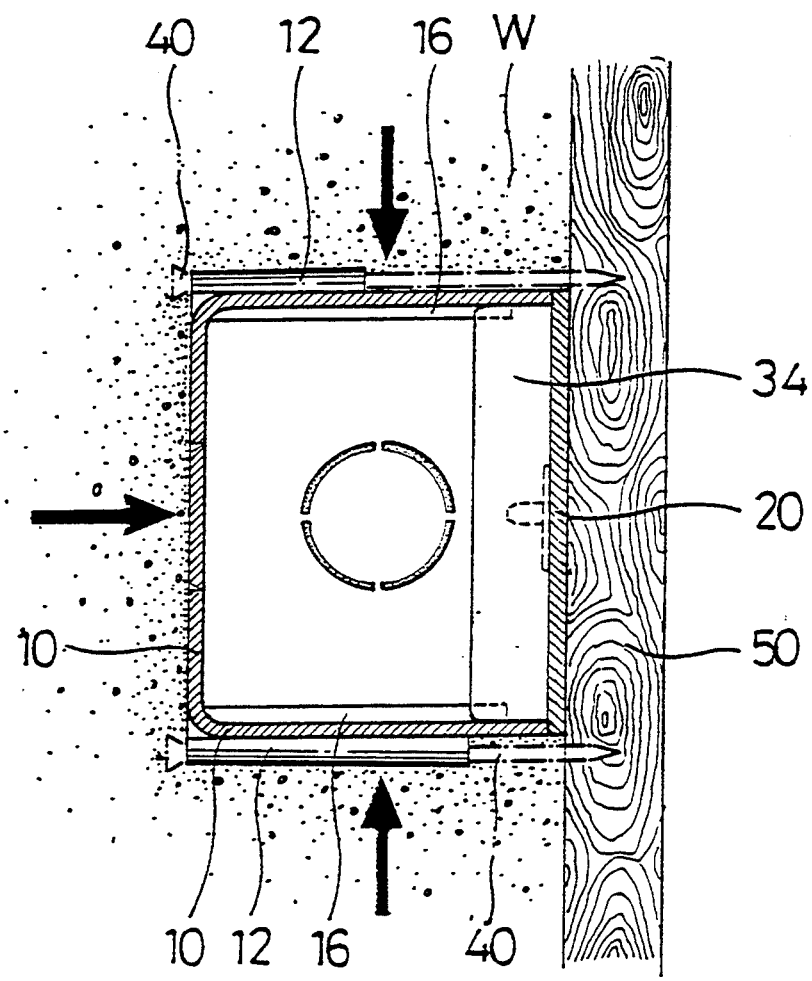
FIG. 2 is a plan view showing the junction box embedded in concrete within the wall.
Figure 3:
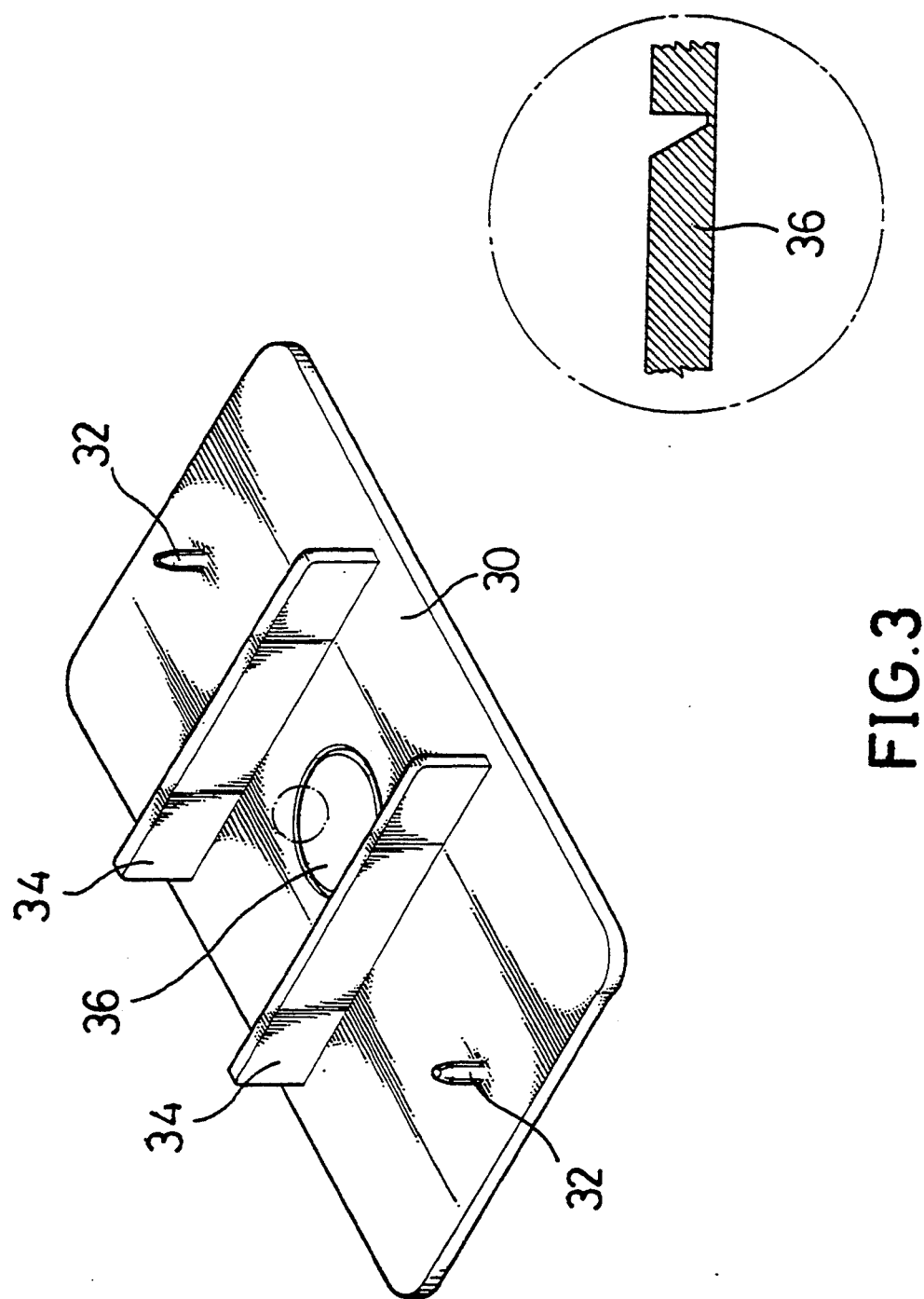
FIG. 3 is a perspective oblique bottom view of the rigid cover board.

Referring to FIG. 1 and 2, a junction box constructed in accordance with the present invention is generally comprised of a flexible plastic casing 10 having a top opening through which a device, for example: a switch, is inserted into the casing 10, two metal mounting tabs 20, and a flush type rigid cover board 30. The casing 10 comprises two recessed portions 14 on the topmost edge thereof at two opposite locations, opposite parts of through holes 15 on the upright peripheral wall thereof below the recessed portions 14 respectively, a plurality of vertical flanges 16 spaced around the upright peripheral wall on the inside, a plurality of horizontal flanges 17;18 spaced by gaps 19 around the upright peripheral wall on the inside above the vertical flanges 16, and a plurality of upright sleeves 12 spaced around the upright peripheral wall on the outside. The metal mounting tabs 20 are identical and respectively made from stainless steel in thickness 1 to 2 mm through a punching process. Each mounting tab 20 comprises an horizontal projection 22 with a through hole 221 and pairs of horizontal pins 23 vertically spaced at the front, and a horizontal wing 21 at the back. The horizontal pins 23 are properly spaced so that they can be inserted into the respective through holes 15 as the horizontal projection 22 is engaged into either recessed portion 14 from the outside. The rigid cover board 30 is made from a rigid plate, which fits into the top opening of the casing 10 and is supported above the horizontal flanges 17;18, having a unitary stripping strip 36 formed in the center by punching, which can be conveniently detached from the rigid cover board 30 so as to provide a finger hole on the rigid cover board 30 for inserting a finger in pulling the rigid cover board 30 away from the casing 10 after its installation, two bottom pins 32 at two opposite locations, which fit into the through hole 221 on the horizontal projection 22 of either mounting tab 20, and two bottom ribs 34 transversely spaced at the bottom, which insert into the gaps 19 as the rigid cover board 30 is attached to the casing 10. When covered on the casing 10, the rigid cover board 30 is disposed flush with the topmost edge of the casing 10.

Figure 4:
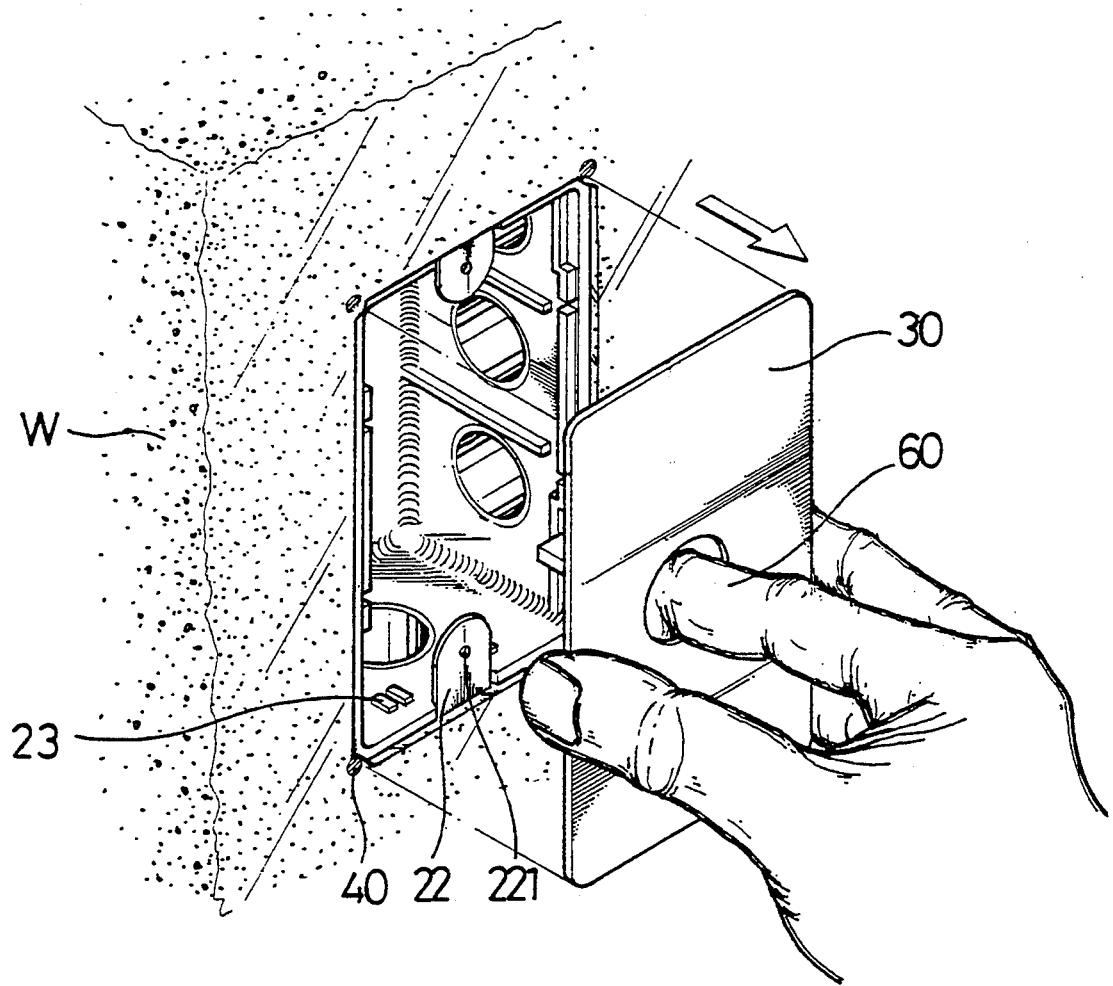
FIG. 4 is a pictorial drawing showing the rigid cover board removed from the casing of the junction box.
Figure 5:
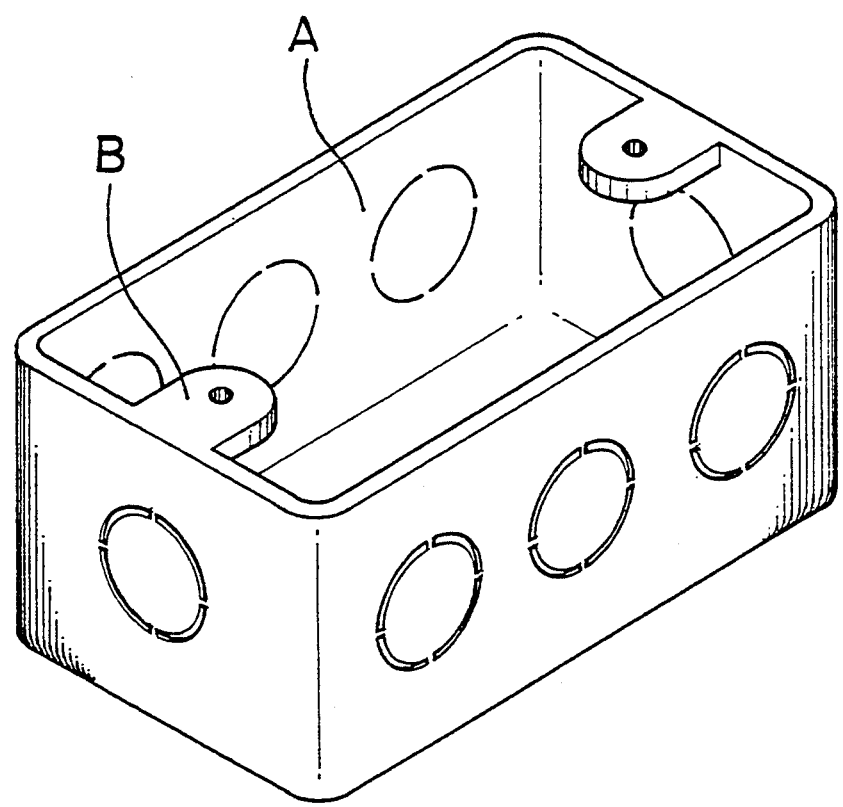
FIG. 5 is a perspective view of a junction box constructed according to the prior art.

Referring to FIGS. 2 and 4, the casing 10 is fastened to the wooden form 50 by nails 40, which are respectively inserted into the upright sleeves 12, the rigid cover board 30 is covered on the casing 10 by inserting the bottom pins 32 into the through hole 221 on the horizontal projection 22 of either metal mounting tab 20 and the bottom ribs 34 into the gaps 19 respectively, and then concrete W is applied to the wall and covered around the junction box. Because the casing 10 is stretched and covered by the rigid cover board 30, the casing 10 does not deform when squeezed by concrete W, and concrete W is prohibited from entering the casing 10 or blocking the through hole 221 on the horizontal projection 22 of either metal mounting tab 20. After setting, the rigid cover board 30 is removed from the casing 10 by piercing one finger through the stripping strip 36 and then hooking up the rigid cover board 30. Because the horizontal wing 21 of each mounting tab 20 and the upright sleeves 12 are embedded in concrete W, the whole assembly of the junction box is tightly fixed within the wall. Because the mounting tabs 20 are made of stainless steel, they do not gather rust and will not be damaged easily, and the through hole 221 on the horizontal projection 22 will not be expanded due to frequently threading in or out the tie screw in holding a device inside the casing 10. Further, the stripping strip 36 may be fastened to the rigid cover board 30 again by an adhesive tape so that the rigid cover board 30 can be kept for a repeat use.

What is claimed is:

1. A junction box comprising:

a casing having two recessed portions on the topmost edge around a top opening thereof at two opposite locations, a plurality of first through holes and a plurality of second through holes on an upright peripheral wall thereof respectively disposed below said recessed portions, a plurality of horizontal flanges spaced by gaps around said upright peripheral wall on the inside;

two mounting tabs respectively made of stainless steel through a punching process, each mounting tab comprising a horizontal projection inserted into either recessed portion and projecting into the holding space of said casing, said horizontal projection having a through hole for inserting a screw in fastening an electric device within said casing, pairs of horizontal pins respectively fitted into said first through holes or said second through holes, and a horizontal wing disposed outside said casing;

a cover board made of a rigid plate fitted into the top opening of said casing and supported above said horizontal flanges and over covered the horizontal projection of each metal mounting tab, said cover board having two bottom pins respectively fitted into the through hole on the horizontal projection of either metal mounting tab, and a plurality of bottom ribs respectively inserted into the gaps in said horizontal flanges.

2. The junction box of claim 1 wherein said casing comprises a plurality of upright flanges spaced around said upright peripheral wall.

3. The junction box of claim 1 wherein said rigid cover board comprises a unitary stripping strip formed in the center by punching which can be detached from the cover board to form a finger hole by piercing one finger.

4. The junction box of claim 3 wherein said finger hole can be sealed again by attaching said stripping strip to said rigid cover board by an adhesive tape each time it was detached.

* * * * *